Aug. 24, 1943.   I. S. KEELER ET AL   2,327,904
DOOR AND REGULATOR HANDLE
Filed Sept. 9, 1940
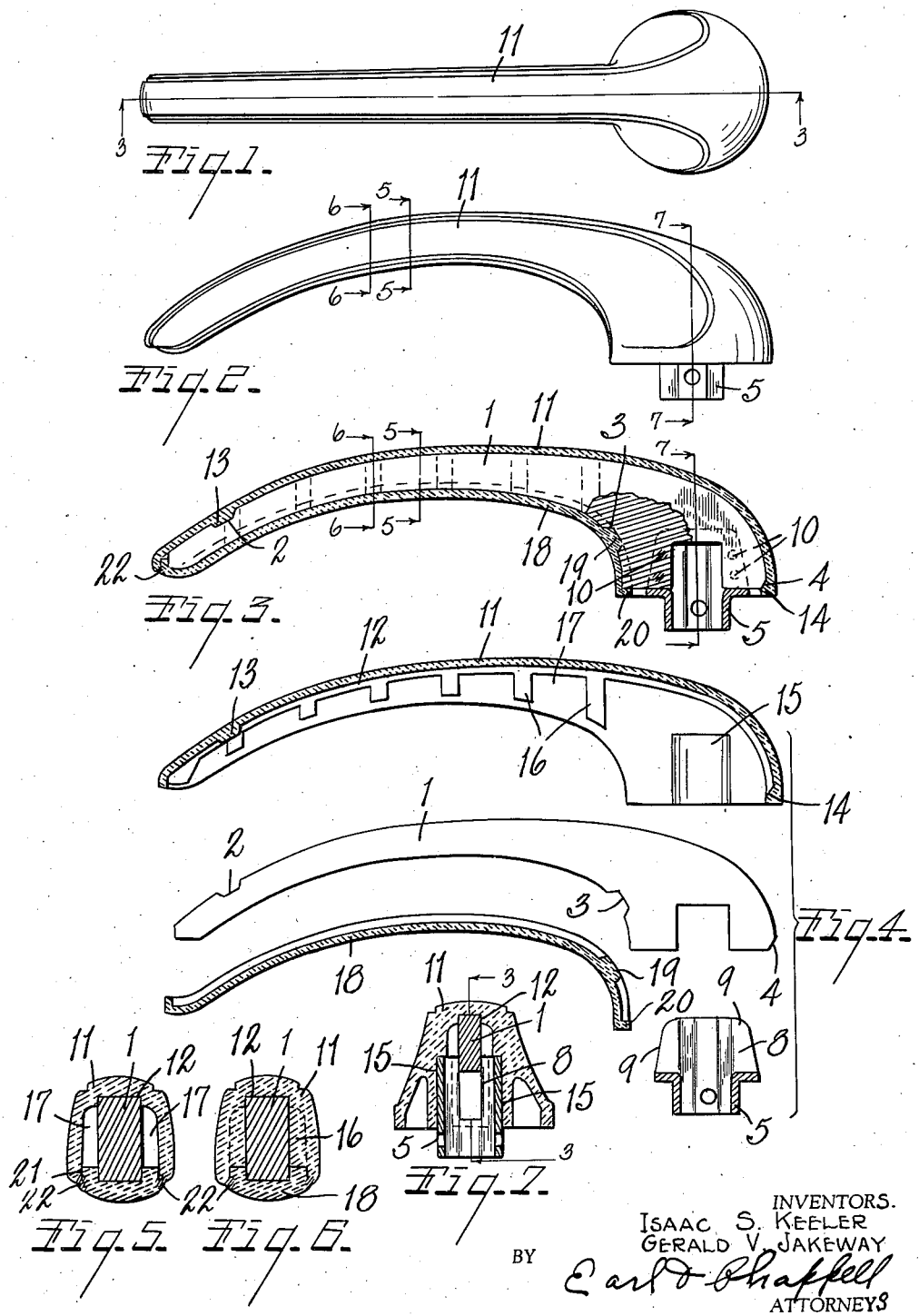
INVENTORS.
ISAAC S. KEELER
GERALD V. JAKEWAY
BY Earl D. Chappell
ATTORNEYS Patented Aug. 24, 1943

2,327,904

UNITED STATES PATENT OFFICE 2,327,904

DOOR AND REGULATOR HANDLE

Isaac S. Keeler and Gerald V. Jakeway, Grand Rapids, Mich., assignors to Keeler Brass Company, Grand Rapids, Mich.

Application September 9, 1940, Serial No. 356,010

7 Claims. (Cl. 292—347)

This invention relates to improvements in door and regulator handles.

The main objects of this invention are:

First, to provide an improved handle for doors, window regulators or remote controls which is very attractive in appearance, the external portions of which are molded of plastic material, such, for example, as "Tenite," and at the same time provides a structure which is strong and rigid.

Second, to provide a handle of the character described which is capable of very wide variation in external design without materially changing the handle bar, except as the general outline may be modified.

Third, to provide a structure having these advantages in which the parts are simple and economical to produce and assemble, and one in which the casing parts are joined so as to be substantially integral or in one piece.

Further objects and advantages pertaining to details and economies of construction and operation will appear from the description to follow. The invention is defined in the claims. A preferred embodiment of our invention is illustrated in the accompanying drawing, in which:

Fig. 1 is a front elevation of a door handle embodying the features of my invention.

Fig. 2 is a side elevation thereof.

Fig. 3 is a longitudinal section on line 3—3 of Figs. 1 and 7, the handle bar being partially shown in full lines.

Fig. 4 is an exploded view of the parts of our invention, the casing parts being shown in central longitudinal section, as is also the spindle socket member.

Figs. 5, 6 and 7 are transverse sections on the section lines 5—5, 6—6 and 7—7, respectively, of Figs. 2 and 3, considerably enlarged.

We have illustrated our invention in the accompanying drawing as embodied in a door handle or remote control handle for motor vehicles. The embodiment of our invention illustrated comprises a handle bar 1 which is tapered and longitudinally curved to the desired shape, this bar being of flat cross section and preferably formed of a suitable grade of metal and may, if desired, be stamped from plate metal.

It will be noted that the handle bar 1 has a recess 2 in its outer edge, a recess 3 in its inner edge, and an undercut 4 at its heel. The handle bar is provided with a spindle socket 5 preferably formed as a sheet metal stamping which is provided with a slot 8 receiving a portion of the handle bar 1 and with flanges 9 which are spot welded at 10 to the handle bar.

The outer casing member 11 is formed or molded of a suitable plastic material, for example the material known as "Tenite," and is curved to correspond to the outer edge of the handle bar and has a longitudinal internal groove 12 fittingly receiving the outer edge of the handle bar. The casing member has a lug-like portion 13 fitting in the recess 2 of the handle bar and a lug portion 14 fitting in the undercut 4 of the handle bar. The casing member is provided with opposed internal recesses 15, see Figs. 4 and 7, receiving the spindle socket member.

This outer casing member is preferably shell-like and the internal dimensions of its channel are substantially wider than the handle bar. We therefore provide the rib-like internal portions 16 which reinforce the casing member and these are in supporting engagement with the sides of the handle bar, as best shown in Fig. 6, the spaces between the rib portions 16 being shown at 17 in Fig. 5.

The inner casing or backing member 18 is longitudinally curved to fit the inner edge of the handle bar and is provided with a lug portion 19 fitting the recess 3 in the inner edge of the handle bar and a portion 20 engaging the butt end of the handle bar. This inner casing member 18 is of channel section, the channel 21 thereof being of such dimensions as to fittingly receive the inner edge of the handle bar. In this embodiment illustrated, it will be noted that the flanges of the inner member telescope within and are in fitting engagement with the flanges of the outer member.

The casing members are secured together by the autogenous fused connections 22 which may be produced with a suitable solvent or, in certain plastics, by the localized application of heat. The casing members are both in supporting engagement with the handle bar and are also in the interlocking engagement so that they cannot be stripped off, notwithstanding the tapered form of the handle bar and the casing. The handle bar is entirely encased, that is with the exception of the inwardly facing butt end.

It is believed that it will be clear to those skilled in the art that the external design may be very greatly varied without material variation in the general structure. Certain plastic materials, for example "Tenite," lend themselves to a wide variety of colors and color combinations.

We have illustrated and described our improvements in a highly satisfactory embodiment thereof. We have not attempted to illustrate and describe various embodiments and adaptations which we contemplate, as it is believed this disclosure will enable those skilled in the art to embody or adapt our improvements as may be desired.

Having thus described our invention, what we claim as new and desire to secure by Letters Patent is:

1. In a handle, the combination of a tapered longitudinally curved handle bar of flattened cross section and having recesses in its outer and inner edges and an undercut at the heel thereof, a spindle socket member slotted to receive said handle bar and having flanges secured to the sides thereof, said handle bar having a spindle receiving recess alined with said socket, the walls of the recess complementing the walls of the socket, a casing member of channel cross section formed of plastic material and having an inwardly facing longitudinal groove fittingly receiving the outer edge of said handle bar, a lug portion engaging said recess therein, and a lug at the heel thereof engaging said undercut at the heel of said handle bar, said casing member being of substantially greater width than said handle bar and having spaced internal rib-like portions engaging the sides thereof, an internal web portion fittingly receiving the inner end of said socket member, a backing member also formed of plastic material having a longitudinal groove receiving the inner edge of said handle bar, and a lug engaging said recess therein, said backing member fitting between the flanges of said casing member and having autogenous fused connection thereto.

2. In a handle, the combination of a tapered longitudinally curved handle bar of flattened cross section, a spindle socket member slotted to receive said handle bar and having flanges secured to the sides thereof, said handle bar having a spindle receiving recess alined with said socket, the walls of the recess complementing the walls of the socket, a casing member of channel cross section formed of plastic material and having an inwardly facing longitudinal groove fittingly receiving the outer edge of said handle bar, said casing member being of substantially greater width than said handle bar and having spaced internal rib-like portions engaging the sides thereof, an internal web portion fittingly receiving the inner end of said socket member, and a backing member also formed of plastic material having a longitudinal groove receiving the inner edge of said handle bar, said backing member fitting between the flanges of said casing member and having autogenous fused connection thereto.

3. In a handle, the combination of a handle bar provided with spindle attaching means, said handle bar being of flattened cross section and having recesses in its outer and inner edges and an undercut at the heel thereof, a casing member of channel cross section formed of plastic material and having an inwardly facing longitudinal groove fittingly receiving the outer edge of said handle bar, a lug portion engaging said recess therein and a lug at the heel thereof engaging said undercut at the heel of said handle bar, said casing member being of substantially greater width than said handle bar and having spaced internal rib-like portions engaging the sides thereof, a backing member also formed of plastic material having a longitudinal groove receiving the inner edge of said handle bar, and a lug engaging said recess therein, said backing member being disposed between the flanges of said casing member and having fused connection thereto.

4. In a handle, the combination of a handle bar provided with spindle attaching means, said handle bar being of flattened cross section, a casing member of channel cross section formed of plastic material and having an inwardly facing longitudinal groove fittingly receiving the outer edge of said handle bar, said casing member being of substantially greater width than said handle bar and having spaced internal rib-like portions engaging the sides thereof, and a backing member also formed of plastic material having a longitudinal groove receiving the inner edge of said handle bar, said backing member being disposed between the flanges of said casing member and having fused connection thereto.

5. In a handle, the combination of a tapered longitudinally curved handle bar having recesses in its outer and inner edges and an undercut at the heel thereof, a spindle socket member slotted to receive said handle bar and having flanges secured to the sides thereof, said handle bar having a spindle receiving recess alined with said socket, an outer casing member of channel cross section formed of plastic material embracing said handle bar and having a portion engaging said recess in the outer edge of said handle bar, a portion at the heel thereof engaging said under cut at the heel of said handle bar and an internal web portion in supporting engagement with the inner end of said socket member, and an inner casing member also formed of plastic material conformed to receive the inner edge of said handle bar and having a portion engaging said recess therein, said inner casing member fitting the flanges of said outer casing member and being secured thereto.

6. In a handle, the combination of a handle bar having recesses in its outer and inner edges, an outer casing member of channel cross section formed of plastic material embracing said handle bar and having a portion engaging said recess in the outer edge of said handle bar, and an inner casing member also formed of plastic material conformed to receive the inner edge of said handle bar and having a portion engaging said recess therein, said inner casing member being in joint engagement with the flanges of said casing member and adhered thereto.

7. In a handle, the combination of a handle bar provided wtih spindle attaching means and having recesses therein, a casing member of channel cross section formed of plastic material receiving and in supporting engagement with said handle bar and having a portion engaging one of said recesses therein, and a backing member also formed of plastic material receiving the inner edge of said handle bar, and having a portion engaging another of said recesses therein, said backing member being disposed between the flanges of said casing member and secured thereto.

ISAAC S. KEELER.
GERALD V. JAKEWAY.